(12) United States Patent
Thomason et al.

(10) Patent No.: US 10,699,201 B2
(45) Date of Patent: Jun. 30, 2020

(54) PRESENTING RELEVANT CONTENT FOR CONVERSATIONAL DATA GATHERED FROM REAL TIME COMMUNICATIONS AT A MEETING BASED ON CONTEXTUAL DATA ASSOCIATED WITH MEETING PARTICIPANTS

(71) Applicant: ENT. SERVICES DEVELOPMENT CORPORATION LP, Houston, TX (US)

(72) Inventors: Simon Thomason, Ashford, NJ (US); Kieran George McCorry, Belfast (GB)

(73) Assignee: ENT. SERVICES DEVELOPMENT CORPORATION LP, Houston, TX (US)

(*) Notice: Subject to any disclaimer, the term of this patent is extended or adjusted under 35 U.S.C. 154(b) by 804 days.

(21) Appl. No.: 14/895,103

(22) PCT Filed: Jun. 4, 2013

(86) PCT No.: PCT/US2013/044036
§ 371 (c)(1),
(2) Date: Dec. 1, 2015

(87) PCT Pub. No.: WO2014/196959
PCT Pub. Date: Dec. 11, 2014

(65) Prior Publication Data
US 2016/0125301 A1    May 5, 2016

(51) Int. Cl.
*G06N 5/04*      (2006.01)
*G06N 20/00*     (2019.01)
(Continued)

(52) U.S. Cl.
CPC ........... *G06N 5/048* (2013.01); *G06F 16/334* (2019.01); *G06N 20/00* (2019.01); *G06Q 10/00* (2013.01)

(58) Field of Classification Search
None
See application file for complete search history.

(56) References Cited

U.S. PATENT DOCUMENTS 6,100,882 A * 8/2000 Sharman ............. H04L 12/1822
  704/235
6,289,140 B1 * 9/2001 Oliver .................... G10L 15/30
  382/313

(Continued)

FOREIGN PATENT DOCUMENTS

CN      101814117       8/2010
WO   WO-2009086233      7/2007

(Continued)

OTHER PUBLICATIONS

Hung et al., Towards a Context-Based Dialog Management Layer for Expert Systems, Int'l Conference on Information, Process, and Knowledge Management (2009) at pp. 60-65. (Year: 2009).*

(Continued)

*Primary Examiner* — Kamran Afshar
*Assistant Examiner* — Benjamin J Buss
(74) *Attorney, Agent, or Firm* — Sheppard Mullin Richter & Hampton LLP (57) ABSTRACT

Identifying relevant content for data gathered from real time communications includes obtaining conversational data from a real time communication, identifying contextual data with at least one contextual data source relevant to the real time communication, and inferring a meaning of the conversational data based on the contextual data.

12 Claims, 5 Drawing Sheets

(51) Int. Cl.
*G06F 16/33* (2019.01)
*G06Q 10/00* (2012.01)

(56) References Cited

U.S. PATENT DOCUMENTS

| | | | | |
|---|---|---|---|---|
| 6,718,336 | B1 | 4/2004 | Saffer et al. | |
| 6,754,631 | B1* | 6/2004 | Din | G10L 15/26 704/270 |
| 7,165,060 | B2 | 1/2007 | Foster et al. | |
| 8,271,364 | B2 | 9/2012 | Nobili et al. | |
| 2004/0006697 | A1 | 1/2004 | Noyama | H04L 9/32 713/182 |
| 2005/0192056 | A1* | 9/2005 | Karaki | H04W 48/04 455/561 |
| 2006/0155802 | A1* | 7/2006 | He | H04L 29/06 709/203 |
| 2006/0294453 | A1* | 12/2006 | Hirata | G10L 15/26 715/203 |
| 2009/0077180 | A1 | 3/2009 | Flowers et al. | |
| 2009/0265755 | A1* | 10/2009 | Hamilton, II | H04L 63/0227 726/1 |
| 2009/0327851 | A1 | 12/2009 | Raposo | |
| 2010/0070640 | A1* | 3/2010 | Allen, Jr. | G06Q 10/10 709/229 |
| 2011/0029885 | A1* | 2/2011 | Camenisch | G06F 3/04815 715/741 |
| 2011/0029985 | A1* | 2/2011 | Balandin | G06F 9/526 718/107 |
| 2011/0314392 | A1* | 12/2011 | Howarth | G06F 21/6218 715/753 |
| 2012/0016678 | A1* | 1/2012 | Gruber | G06F 17/3087 704/275 |
| 2012/0078595 | A1* | 3/2012 | Balandin | G06F 16/367 703/6 |
| 2012/0143605 | A1* | 6/2012 | Thorsen | G10L 15/183 704/235 |
| 2012/0158655 | A1 | 6/2012 | Dove et al. | |
| 2012/0239761 | A1 | 9/2012 | Linner et al. | |
| 2012/0245944 | A1 | 9/2012 | Gruber et al. | |
| 2012/0253788 | A1* | 10/2012 | Heck | G06F 17/279 704/9 |
| 2014/0280955 | A1* | 9/2014 | Stuntebeck | H04L 63/0435 709/226 |
| 2015/0193819 | A1* | 7/2015 | Chang | G06Q 30/0252 705/7.19 |

FOREIGN PATENT DOCUMENTS

| | | | | |
|---|---|---|---|---|
| WO | WO-2013042116 | | 3/2013 | |
| WO | WO-2013042116 A1 * | | 3/2013 | G06Q 40/02 |

OTHER PUBLICATIONS

Pilato et al., A Modular Architecture for Adaptive ChatBots, Fifth IEEE Int'l Conference on Semantic Computing (2011) at pp. 177-180 (Year: 2011).*

James Madison's Notes on Debates at the Federal Constitutional Convention, 1787 at p. 1 (Year: 1787).*

Jebara, T. et al. (2000). "Tracking conversational context for machine mediation of human discourse." AAAI Fall 2000 Symposium—Socially Intelligent Agents—The Human in the Loop. 2000. 3 pages. (Year: 2000).*

Danninger, M.et al. (Oct. 2005). "The connector: facilitating context-aware communication". In Proceedings of the 7th international conference on Multimodal interfaces (pp. 69-75). ACM. (Year: 2005).*

Chen, H. (2004). "An intelligent broker architecture for pervasive context-aware systems." PhD Diss. University of Maryland. (2004). (Year: 2004).*

Dai, P. et al. (2008). "Group interaction analysis in dynamic context." IEEE Transactions on Systems, Man, and Cybernetics, Part B (Cybernetics) 38.1 (2008): 275-282. (Year: 2008).*

Nijholt, A. et al. (2006). "Online and off-line visualization of meeting information and meeting support." The Visual Computer 22.12 (2006): 965-976. (Year: 2006).*

Voss, L.L. et al. (2007). "The CALO meeting assistant." Proceedings of Human Language Technologies: The Annual Conference of the North American Chapter of the Association for Computational Linguistics (NAACL-HLT). 2007. (Year: 2007).*

Tur, G. et al. (2010). "The CALO meeting assistant system." IEEE Transactions on Audio, Speech, and Language Processing 18.6 (2010): 1601-1611. (Year: 2010).*

Chen, H. (2004). "A context broker for building smart meeting rooms." Proceedings of the AAAI Symposium on Knowledge Representation and Ontology for Autonomous Systems Symposium, 2004 AAAI Spring Symposium. 2004. (Year: 2004).*

Huq, M.R. et al. (2007). "Modeling an Ontology for Managing Contexts in Smart Meeting Space." SWWS. 2007. (Year: 2007).*

Grange, S. et al. (2004). "M/ORIS: a medical/operating room interaction system." Proceedings of the 6th international conference on Multimodal interfaces. ACM, 2004. (Year: 2004).*

Gieselmann, P. et al. (2003). "Towards multimodal interaction with an intelligent room." Eighth European Conference on Speech Communication and Technology. 2003. (Year: 2003).*

Oracle.com; "Oracle Endeca Information Discovery a Technical Overview"; Dec. 10, 2012; 23 pages.

PCT; "Notification of Transmittal of the International Search Report and the Written Opinion of the International Searching Authority, or the Declaration"; cited in PCT/US2013/044036; dated Feb. 27, 2014; 12 pages.

* cited by examiner

PRESENTING RELEVANT CONTENT FOR CONVERSATIONAL DATA GATHERED FROM REAL TIME COMMUNICATIONS AT A MEETING BASED ON CONTEXTUAL DATA ASSOCIATED WITH MEETING PARTICIPANTS

BACKGROUND

Inter-personal interactions, such as meetings, telephone calls, message exchanges, often include communications between a number of individuals. The inter-personal interactions may take place between individuals within a conference room or using instant messaging systems. Further, the inter-personal interactions may take place between individuals in different towns, states, countries, or continents. Often, meetings use conference calls or video calls to communicate with meeting participants not physically in the conference room during the meeting. During such inter-personal interactions, the participants may request or present information from or to the other participants as part of the inter-personal interaction. This information may be in the form of media, business reports, electronic messages, and other types of information relevant to the inter-personal interaction. Further, a type of interaction may not be limited to inter-personal interactions, but may include machine-machine interactions, person-machine interactions, other interactions, or combinations thereof.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Often during an inter-personal interaction, such as a meeting, a topic may arise that may use or benefit from additional information for clarification or more detailed understanding around the topic. This additional information may or may not be shared amongst some or all of the participants in the interaction. If the participants do not have the additional information readily available, one or multiple of the participants may have to recall the information, find the information in a timely manner, or follow up with the additional information in a later meeting. Not having the additional information may cause a delay in the overall context of the inter-personal interaction until the additional information can be recalled, or located. Further, not having the additional information may lead to inaccurate information being communicated during the interaction.

The principles described herein include a method for identifying relevant content for data gathered from real time communications. Such a method includes obtaining conversational data from a real time communication, identifying contextual data with at least one contextual data source relevant to the real time communication, and inferring a meaning of the conversational data based on the contextual data. In some instances, the use of contextual data may not be appropriate. In such an instance, inferring a meaning of the conversational data is not based on the contextual data. Such a method allows data to be gathered from real time communication and relevant content to be identified in real time. As a result, participants in an inter-personal interaction have information available in real time during the inter-personal interaction.

Further, the method can include analyzing the conversational data based on the contextual data using an analytical technique. The analytical technique will be described in more detail below.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
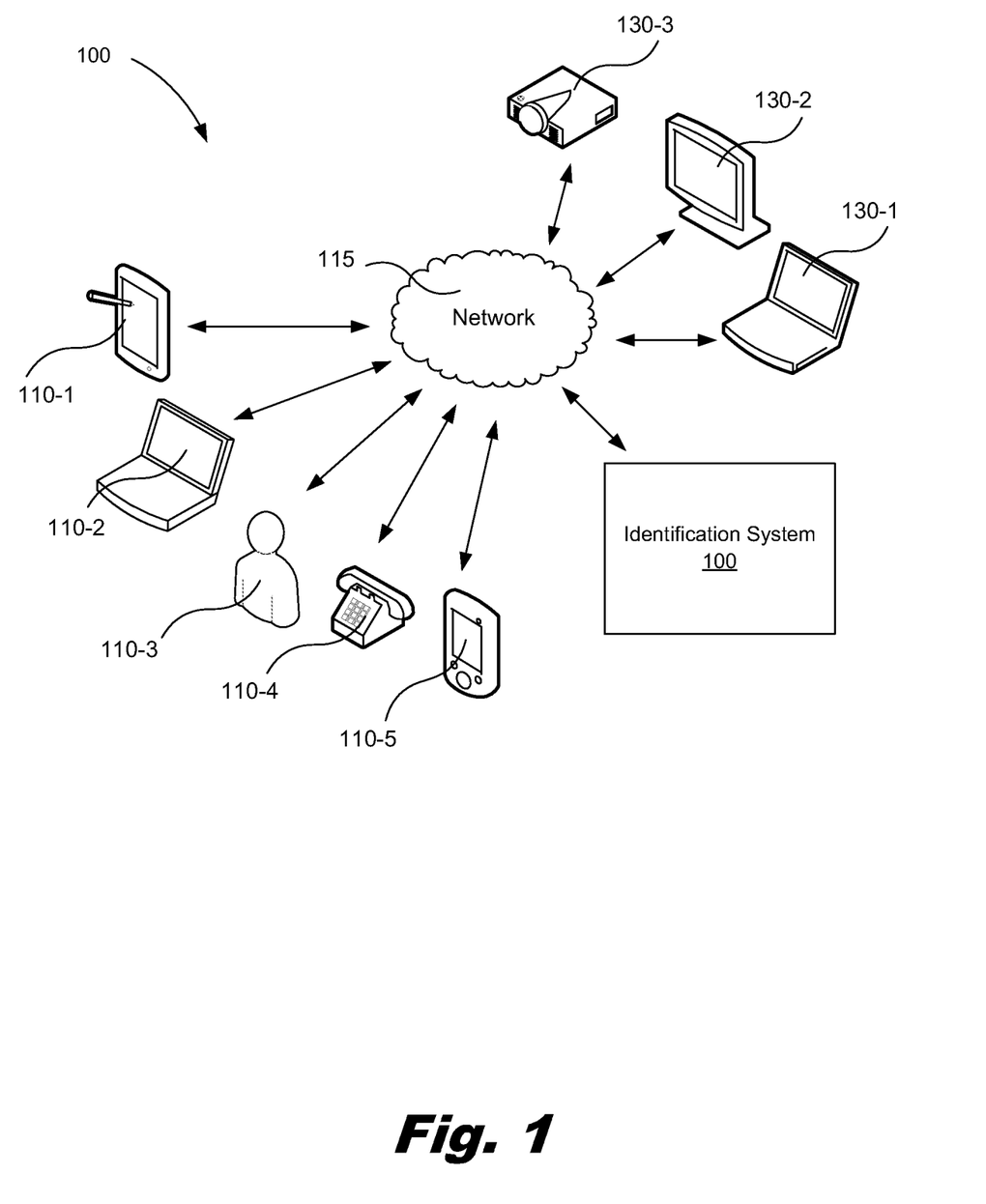
FIG. 1 is a diagram of an example of an identification system according to the principles described herein.

Referring now to the figures, FIG. 1 is a diagram of an example of an identification system (100) according to the principles described herein. As will be described below, the identification system (100) obtains conversational data from a number of conversational data sources in real time. The identification system (100) then infers a meaning of the conversational data based on the contextual data. In one example, the conversational data is sufficient for the identification system (100) to infer a meaning. In such an example, the use of contextual data may not be used. As a result, relevant data may be consumed by other systems or applications to provide additional information that may arise in certain situations.

The identification system (100) includes obtaining conversational data from a conversational data source (110). As will be described below and in other parts of the specification, conversational data sources (110) may include sources such as text-based messaging sources, voice sources, graphic sources, video sources, other sources, or combinations thereof. In one example, conversational data source may be real time communication obtained from an individual and/or user devices.

In one example, real time communication may be a text-based messaging source. For example, text-based messaging may be an instant message, an electronic message, other written messages, or combinations thereof. Further, text-based messaging may be obtained through devices such as a tablet (110-1), a laptop computer (110-2), a phone (110-5), a desktop, a watch, a digital device, another device, or combination thereof. In this example, the real time communication is obtained from user devices.

In another example, conversational data from a real time communication may be obtained from individuals. In one example, the real time communication is obtained from an individual (110-3) through a user device. In this example, a microphone may capture the spoken words of the individual during a meeting. Such a microphone may be incorporated into or connected to a device, such as a tablet (110-1), a laptop computer (110-2), a smart phone (110-5), local line telephone (110-4), another device, or combinations thereof. The microphone may convert the audible words of the individual into a digital format where the words may be stored, accessed, and/or analyzed. Conversational data may be extracted from the digital format of the spoken words.

In yet another example, conversational data from a real time communication may be obtained from graphics and video sources among other complex media format sources. In this example, other complex media format sources may be obtained from a tablet (110), a laptop (110-2), a smart phone (110-5), another device, or combinations thereof.

While this example includes obtaining conversational data from specific sources, any appropriate source of obtaining conversational data may be used. For example, the sources may include a text-based messaging source, a voice source, a complex media format source, an audible source, another type of source, or combinations thereof, The real time communication is obtained by an identification system (100). In the example of FIG. 1, the identification system (100) is located over a network (115), however, the identification system may be located on a user device, be distributed across multiple devices, be incorporated in a physical device, be incorporated in a virtual device, be located at another appropriate location, or combinations thereof. As will be described below and in later sections of the specification, the identification system (100) obtains conversational data from a real time communication. The identification system (100) identifies contextual data with at least one contextual data source relevant to the real time communication. Further, the identification system (100) infers a meaning of the conversational data based on the contextual data, where appropriate. More information about the identification system (100) will be described below.

In one example, after the identification system (100) infers a meaning of the conversational data based on the contextual data, the identification system (100) sends relevant data to an output device (130). In one example, during a meeting, the identification system (100) obtains conversational data about stock reports. The identification system (100) infers that relevant data from the conversational data is stock reports. In this example, the stock reports are presented on an output device such as a laptop computer (130-1). As a result, the stock reports may be viewed by individuals in the meeting via the laptop computer (130-1).

In another example, during a meeting, the identification system (100) obtains conversational data about a research and development project. The identification system (100) infers that relevant data may be the research and development project. In this example, the research and development project is presented on a display (130-2) of an output device. As a result, the research and development project is viewed by individuals in the meeting via the display (130-2).

In yet another example, during a meeting, the identification system (100) obtains conversational data about a corporation's annual business report. The identification system (100) infers that relevant data may be the corporation's annual business report. In this example, the corporation's annual business report is presented on an output device such as a projector (130-3). As a result, the corporation's annual business report is viewed by individuals in the meeting via the projector (130-3).

While this example has been described with reference to the identification system being located over the network, the identification system may be located in any appropriate location according to the principles described herein. For example, the identification system may be located in a user device. In some examples, the identification system infers the meaning of just the conversational data from a text-based message. In other examples, identification system identifies conversational data from a user's spoken words. In yet other examples, the identification system can interpret conversational data from a number of conversational data sources and identify relevant content. Further, the identification system can interpret conversational data based on visual information gathered from a camera for determining the meaning of the conversational data and identifying relevant content.

While this example has been described with reference to relevant data being presented on specific types of output devices, the relevant data may be presented on any appropriate output device. For example, the output device may be a laptop computer, a digital display, a projector, a speaker, another output device, or combinations thereof. Further, the relevant information may be presented on just a single device during the meeting.

As mentioned above, the identification system (100) is well suited for a meeting. For example, a meeting organizer can book a meeting room, using an application program, for himself and one other internal attendee. On entering the meeting room, the identification system (100) recognizes the internal attendee based on information stored within a corporate directory or other employee database. Further, the identification system (100) recognizes the meeting organizer. In this example, the identification system (100) may recognize the meeting organizer and the internal attendee from a contextual data source such as a video source, an audio source, or combinations thereof. In keeping with the given example, the identification system (100) displays information that is relevant to the meeting. The identification system (100) may infer the relevant information for the meeting based on the information the meeting organizer used with booking the meeting room. In one example, the relevant information may be displayed on a laptop computer (130-1), a display (130-2), a projector (130-3), or combinations thereof. The identification system (100) can further understand the role of the meeting organizer in the context of the company and his relation to the internal attendee of the meeting based on the context of the meeting through the booking of the meeting room. The identification system (100) may also restrict the relevant information displayed based on the access controls or security clearances associated with the various individuals in the meeting.

As the meeting commences, the identification system (100) may be set to an active mode or a passive mode. In one example, the identification system (100) has speech recognition. As a result, the identification system (100) can detect if the meeting organizer desires to have the identification system (100) in active mode or passive mode. Further, the identification system (100) can switch between active mode and passive mode for secure conversations.

In one example, if the identification system (100) is in passive mode, the identification system (100) passively listens to the meeting. Further, the identification system (100) may suggest relevant information to the meeting organizer and the internal attendee. In one example, the relevant information is presented on a display (130-2). For example, if the meeting organizer says, "I remember seeing a report on Big Data from Gartner in the last three months", the identification system (100) infers the meaning of the real time communication and searches the Gartner database for relevant information. Once the identification system has gathered the relevant information, the relevant information is presented on the display (130-2).

In another example, if the identification system (100) is in active mode, the identification system (100) listens to the context of the meeting and transcribes the entire meeting to text and audio playback. Further, the identification system (100) annotates text meeting minutes in full detail including recognizing specific voice and speech patterns of the meeting organizer and the internal attendee. In keeping with the given example, the identification system (100) listens to the context of the meeting and offers information relevant to the meeting as the conversation develops. For example, if the internal attendee mentions that he saw a "Gartner report about market analysis of FY12 Telecommunications" as part of the conversation in the meeting, the identification system (100) displays a list of suitable Gartner reports for immediate consumption or awareness of the internal attendees. In this example, the relevant information is provided via a live search of internal or external information at near real-time speeds. Further, information that is relevant to the meeting is capable of being displayed in full or summary.

In another example, the identification system (100) learns acronyms and information specific to an organization. As will be described below, the identification system (100) may utilize contextual dictionaries such as generic dictionaries, medical dictionaries, legal dictionaries, public sector and defense dictionaries, other dictionaries, or combinations thereof so the identification system (100) can infer a meaning of real time communications.

Additionally, the identification system (100) can dial a conference call number and enter any specific security and access codes. Further, the identification system (100) can schedule a follow up call by taking into account the meeting organizer's personal preference, time zones, existing meetings, other information relevant to the meeting organizer, or combinations thereof.

While the identification system has been described with specific reference to a meeting, the identification system may be well suited for other applications. For example, the identification system can be used within corporate environments, classrooms, telecommunications, internet and social media interactions, other applications, or combinations thereof.

Figure 2:
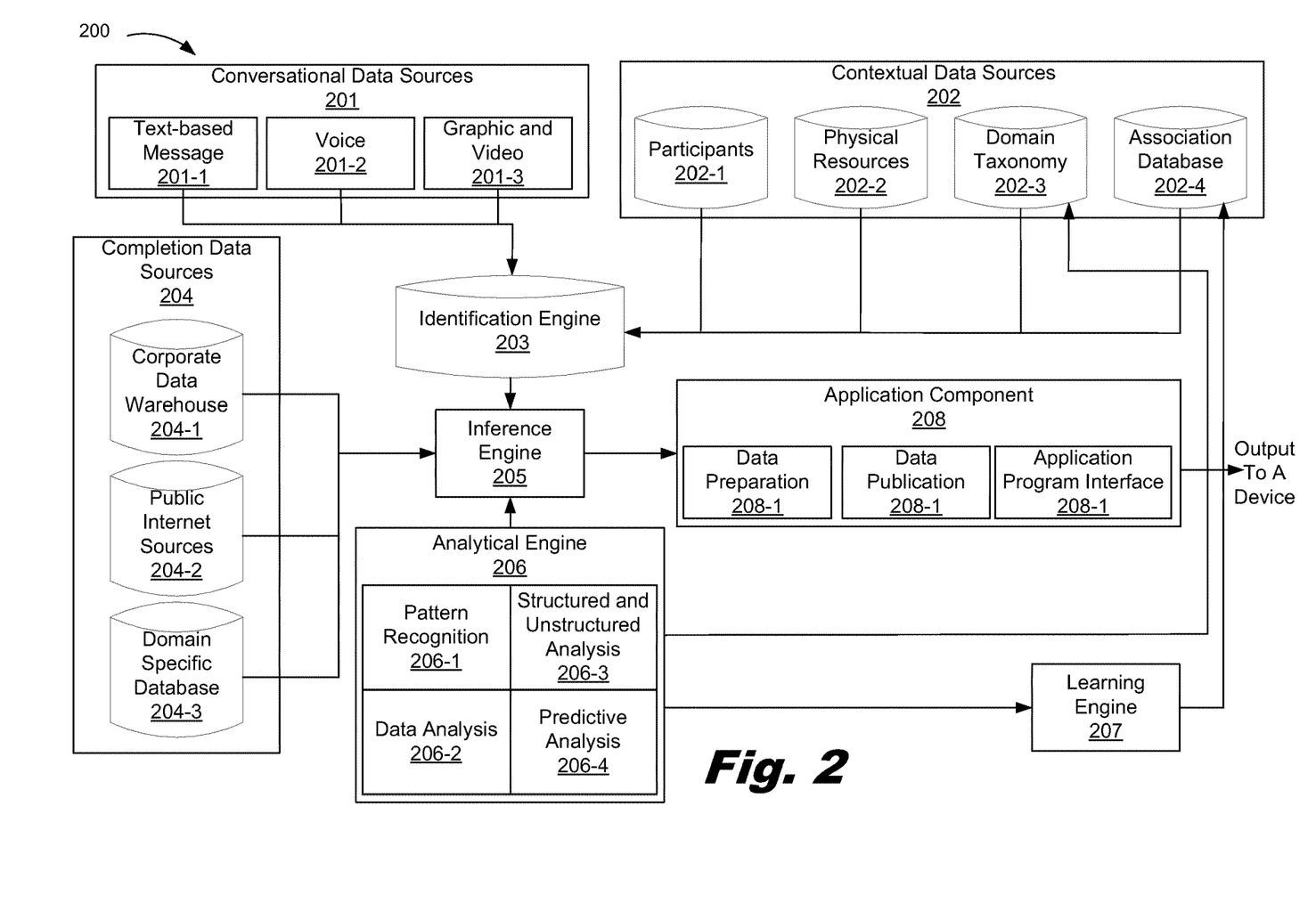
FIG. 2 is a diagram of an example of an identification system according to the principles described herein.

FIG. 2 is a diagram of an example of an identification system (200) according to the principles described herein. As mentioned above, the identification system (200) obtains conversational data from a number of conversational data sources in real time. As will be described below, the conversational data may be combined with at least one contextual data source to provide context for the conversational data. Further, analytics is performed on the conversational data that is combined with at least one contextual data source. The identification system (200) then infers a meaning of the conversational data based on the contextual data. As a result, relevant data may be consumed by other systems or applications to provide additional information that may arise in certain situations.

The identification system (200) includes obtaining conversational data (201) from a real time communication. As mentioned above, conversational data sources (201) may include sources such as text-based messaging (201-1) sources, voice (201-2) sources, graphic and video (201-3) sources, other sources, or combinations thereof. Further, conversational data may be a real time communication obtained from individuals, machines, and/or user devices, such as text messages or electronic messages. The data from the conversational data sources (201) is sent to an identification system (203).

The identification engine (203) identifies contextual data (201) with at least one contextual data source (202) relevant to the real time communication. In this example, contextual data source (202) includes databases that contain information about participants, physical resources, domain taxonomy (202-3), any association databases (202-4), other sources, or combinations thereof.

In one example, a contextual data source (202) may contain a database that contains information about participants. For example, if an instant message communication is taking place between participant A and participant B, metadata about participant A and participant B in may be stored in a participants database (202-1). In keeping with the given example, participant A may work in the financial offices of a corporation. Further, during conversations with participant B, participant A may use a number of financial terms. As a result, metadata about participant A using a number of financial terms in may be stored in the participants database (202-1) for participant A. As a result, if the instant message communication is taking place between participant A and participant C, the identification engine (203) may use the participants database (202-1) to identify contextual data (201) with at least one contextual data source (202), in this example a participants database (202-1), relevant to the real time communication.

As mentioned above, a contextual data source (202) may contain a database that contains information about physical resources. In one example, a physical resource database (202-2) may include information about a meeting room, a type of projector contained in the meeting room, if the meeting room has a speaker-phone, if the meeting room has a whiteboard, other information, or combinations thereof. As a result, if a meeting is scheduled in the meeting room with a projector, the identification system (200) may present relevant data using the projector to a number of individuals in the meeting.

Further, a contextual data source (202) may include a domain taxonomy (202-3). A domain taxonomy (202-3) contains information relevant to specific domains for real time communications. In one example, a domain taxonomy (202-3) may contain medical terminology, legal terminology, or terminology about a specific field of study such as electrical engineering. In one example, the domain taxonomy (202-3) includes two components, a private component and a public component. In this example, the private component is specific to an organization and a public component used broadly across an industry. In one example, if a corporation uses specific terms for classified information, the information about the classified information is stored in the private component of the domain taxonomy (202-3). As a result, if conversational data about classified information is obtained during a meeting, the identification engine (203) may identify the relevant information in the private component of the domain taxonomy (202-3).

In keeping with the given example, if a corporation uses general terms for information used broadly across an industry, information about the general terms are stored in the public component of the domain taxonomy (202-3). As a result, conversational data about the general terms are obtained during a meeting; the identification engine (203) may identify the relevant information in the public component of the domain taxonomy (202-3).

As mentioned above, the contextual data sources (202) include an association database (202-4). The association database (202-4) contains information about relationships between the participants referenced in the conversational data from the conversational data sources (201) and the contextual data sources (202). In one example, information in the association database (202-4) may be discovered by a learning engine (207). More information about the learning engine (207) will be described below. As a result, information such as 'When participant C and participant D communicate they often discuss colors.' This information about the relationship between participant C and participant D may be store in the association database (202-4).

Further, the identification system (203) aggregates the identified contextual data (201) with at least one contextual data source (202) relevant to the real time communication. Further, the aggregated data is sent to an inference engine (205). As will be described below, the inference engine (205) is in communication with an analytical engine (206) to further infer a meaning of the conversational data.

As mentioned above, the identification system (200) includes an analytical engine (206). The analytical engine (206) analyzes the conversational data (201) based on the contextual data (202) using an analytical technique. In this example, an analytical technique may include pattern recognition (206-1), data analysis (206-2), structured and unstructured data analysis (206-3), predictive analysis (206-4), another analysis, or combinations thereof.

In one example, pattern recognition (206-1) provides a reasonable answer for all possible real time communications from a conversational data source (201) and performs a "most likely" matching of the real time communication, taking into account their statistical variation. For example, given a real time communication, a label is assigned to the real time communication. Alternatively, pattern recognition may provide an exact answer for all possible real time communications. As a result, the analytical engine (206) can recognize patterns in the real time communication based on the contextual data from a contextual data source (202).

In another example, the analytical engine (206) uses data analysis (206-2) to analyze real time communications from a conversational data source (201). Data analysis (206-2) is used for inspecting, cleaning, transforming, and modeling real time communications to highlight useful conversational data, suggest conclusions, and support decision making. As a result, the analytical engine (206) can use data analysis (206-2) on the real time communication based on the contextual data from a contextual data source (202).

In yet another example, the analytical engine (206) uses structured and unstructured data analysis (206-3) to analyze real time communications from a conversational data source (201). In one example, structured attributes may consist of, but are not limited to, the conversational data source (201), the location of the conversational data source (201), among others. Alternatively, unstructured attributes may consist of, content of the conversational data source, an image obtained from a conversational data source (201), a video obtained from a conversational data source (201), or combinations thereof. As a result, the analytical engine (206) can use structured and unstructured data analysis on the real time communication based on the contextual data from a contextual data source (202).

In yet another example, the analytical engine (206) uses predictive analysis (206-4) to analyze real time communications from a conversational data source (201). In one example, predictive analysis (206-4) encompasses a variety of techniques from statistics, modeling, machine learning, and data mining that analyze current conversational data to make predictions about future conversational data. As a result, the analytical engine (206) can use predictive analysis on the real time communication based on the contextual data from the contextual data source (202).

As mentioned above, the identification system (200) includes the learning engine (207). The learning engine (207) learns patterns and relationships from the conversational data (201) based on the contextual data (202) from the analytical engine (206). In one example, the patterns and relationships learned from the learning engine (207) are stored in an association database (202-4).

Further, the identification system (200) includes a completion data source (204). The completion data source (204) may be used as a reference for additional contextual data for the conversational data to further infer a meaning of the conversational data or as a source for the relevant complementary information identified by the analysis of the real time communication. In this example, the completion data source (204) includes databases that contain information from corporate data warehouses, public internet sources (204-2), domain specific databases (204-3), or combinations thereof.

In one example, a corporate data warehouse database (204-1) contains information about data and information used within a corporation. For example, the corporate data warehouse database (204-1) may contain information about a corporation's products, the corporation's suppliers, the corporation's employees, other information, or combinations thereof. As a result, information from corporate data warehouses (204-1) may be used to more completely infer a meaning of the real time communications or to provide relevant results.

As mentioned above, the completion data source (204) includes public internet sources (204-2). Public internet sources (204-2) may include public internet sources such as news websites, newsfeed, product sites, information sites, other sites, or combinations thereof. As a result, information from public internet sources (204-2) may be used to more completely infer a meaning of the real time communications or to provide relevant results.

As mentioned above, the completion data source (204) includes a domain specific database (204-3). The domain specific databases (204-3) may contain databases such as medical databases, legal databases, engineering databases, other databases, or combinations thereof. As a result, information from the domain specific database (204-3) may be used to more completely infer a meaning of a real time communication or to provide relevant results.

The identification system (200) includes an inference engine (205). The inference engine (205) infers a meaning of the conversational data of the real time communication based on the contextual data, if appropriate. In this example, the inference engine (205) is in communication with the analytical engine (205).

In one example, the inference engine (205), in communication with the analytical engine (206), processes conversational data based on the contextual data, to enhance the capability of the identification system (200). This enhanced capability allows the inference engine (205) to identify relevant information from the real time communication. For example, if an instant messaging conversation is taking place between two participants within an organization, metadata about the participants in the conversation may be obtained from a contextual data source (202) such as a corporate directory. In this example, the corporate directory may indicate that the participants work, for example, in a finance department. In keeping with the given example, the useful contextual information allows the inference engine (205) to use data from the domain taxonomy database (202-3). As a result, financial terms used during the real time communication such as 'GAAP' may be properly interpreted in context.

In another example, if previous real time communications have taken place involving a project name, information relevant to this project may be extracted from the association database (202-4). In one example, the relevant information is extracted by the inference engine (205) to further clarify the exact nature of the real time communication.

The identification system (200) includes an application component (208). The application component (208) prepares relevant data for data preparation (208-1), prepares the relevant data for data publication (208-2), and uses an application program interface (208-3) to output the relevant data to a device (FIG. 1, 130). Further, the application program interface (208-3) is a facility to provide access to the insights discovered by the inference engine (205) by any number of consuming clients or applications. For example, during a meeting, an individual may state "company x's market capitalization figure is, I think lower than company y's." In this example, the analytical engine (206) can identify relevant terms and comparators in the real time communication. The inference engine (205) extracts market capitalization figures from the completion data sources (204) and presents this enhanced information to the individuals in the meeting as described above.

Figure 3:
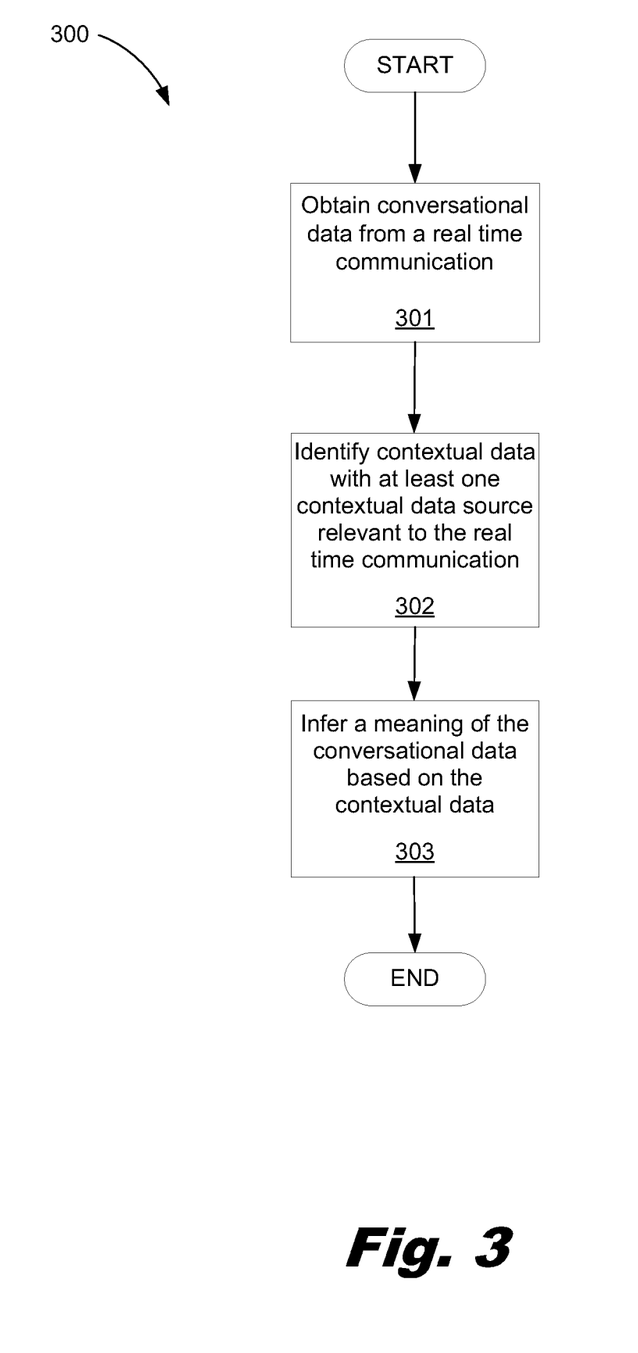
FIG. 3 is a flowchart of an example of a method for identifying relevant content for data gathered from real time communications according to one example of principles described herein.

FIG. 3 is a flowchart of an example of a method for identifying relevant content for data gathered from real time communications according to one example of principles described herein. In this example, the method (300) includes obtaining (301) conversational data from a real time communication, identifying (302) contextual data with at least one contextual data source relevant to the real time communication, and inferring (303) a meaning of the conversational data based on the contextual data.

The method (300) includes obtaining (301) conversational data from a real time communication. As mentioned above, real time communication may be obtained from individuals and/or user devices. In one example, real time communication may be text-based messaging. For example, text-based messaging may be an instant message, an electronic message, other types of message, or combinations thereof. Further, text-based messaging may be obtained through a device such as a desktop computer, a laptop computer, a phone, a watch, an electronic tablet, a digital device, another type of device, or combinations thereof. In this example, the real time communication is obtained from user devices. In another example, conversational data from a real time communication may be obtained from individuals.

In another example, real time communication may be obtained from a user's voice. In this example, a microphone on a device, such as a desktop computer, a laptop computer, or smart phone may obtain a user's audible sounds and convert these sounds into a useable format.

In yet another example, conversational data from a real time communication may be obtained from graphics and video among other complex media formats. While the above example include obtaining conversational data from real time communication in the form of a text-based messaging source, a voice source, and a complex media format, any appropriate source for obtaining conversational data may be used.

The method further includes identifying (302) contextual data with at least one contextual data source relevant to the real time communication. As mentioned above, a contextual data source may include databases that contain information about participants, physical resources, domain taxonomy, association databases, other sources, or combinations thereof.

As mentioned above, a contextual data source may contain a database that contains information about participants. As a result, an inference engine may use a participants database to identify contextual data relevant to a real time communication.

As mentioned above, a physical resource database may include information about a meeting room, a type of projector contained in the meeting room, if the meeting room has a speaker-phone, if the meeting room has a whiteboard, other details about the meeting room, or combinations thereof. As a result, an inference engine may use a physical resource database to identify contextual data relevant to a real time communication.

As mentioned above, a domain taxonomy contains information relevant to specific domains for real time communications. As a result, an inference engine may use a domain taxonomy to identify contextual data relevant to a real time communication.

As mentioned above, an association database contains information about relationships between the participants referenced in the conversational data from the conversational data sources and the contextual data sources. As a result, an inference engine may use an association database to identify contextual data relevant to a real time communication.

Finally, the method includes inferring (303) a meaning of the conversational data based on the contextual data. In the example above, if an instant messaging real time conversation is taking place between two participants within an organization, metadata about the participants in the conversation may be obtained from a contextual data source such as a corporate directory. In this example, the corporate directory may indicate that the participants work in a finance department. In keeping with the given example, the useful contextual information allows the inference engine to use data from the domain taxonomy database. As a result, financial terms used during the real time communication such as 'GAAP' may be properly interpreted in context.

Figure 4:
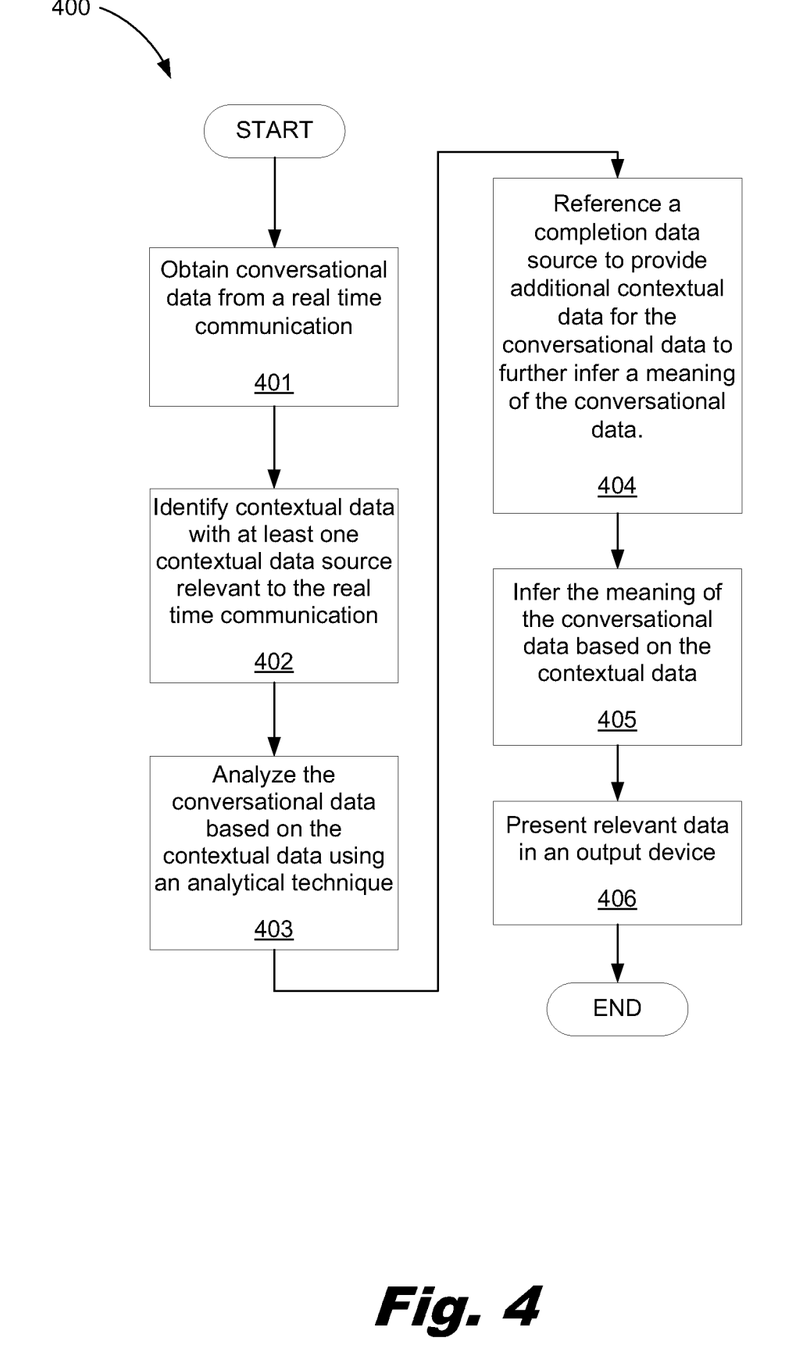
FIG. 4 is a flowchart of an example of a method for identifying relevant content for data gathered from real time communications according to one example of principles described herein.

FIG. 4 is a flowchart of an example of a method for identifying relevant content for data gathered from real time communications, according to one example of principles described herein. In this example, the method (400) includes obtaining (401) conversational data from a real time communication, identifying (402) contextual data with at least one contextual data source relevant to the real time communication, analyzing (403) the conversational data based on the contextual data using an analytical technique, referencing (404) a completion data source for additional contextual data for the conversational data to further infer a meaning of the conversational data, inferring (405) the meaning of the conversational data based on the contextual data, and presenting (406) relevant data in an output device.

In one example, analyzing (403) the conversational data based on the contextual data an analytical technique includes pattern recognition, data analysis, structured and unstructured data analysis, predictive analysis, other techniques, or combinations thereof. While this example has been described with reference to specific mechanism for analysis, any appropriate mechanism for analysis may be used in accordance with the principles described herein.

As mentioned above, pattern recognition provides a reasonable answer for potential real time communications from a conversational data source and performs a "most likely"

matching of the real time communication, taking into account their statistical variation. For example, given a real time communication, a label is assigned to the real time communication. Alternatively, pattern recognition may provide an exact answer for all possible real time communications. As a result, the analytical engine can recognize patterns in the real time communication based on the contextual data from a contextual data source.

In one example, analyzing (403) the conversational data based on the contextual data uses data analysis for inspecting, cleaning, transforming, and modeling conversational data to highlight useful conversational data, suggest conclusions, and support decision making. As a result, data analysis can be used to analyze the conversational data based on the contextual data.

In another example, analyzing (403) the conversational data based on the contextual data uses structured attributes. As mentioned above, structured attributes may consist of, but are not limited to, the conversational data source, the location of the conversational data source, other information about the conversational data source, or combinations thereof. Alternatively, unstructured attributes may include content of the conversational data source, an image obtained from a conversational data source, a video obtained from a conversational data source, other types of information from the conversational data source, or combinations thereof. As a result, structured and unstructured attributes can be used to analyze the conversational data based on the contextual data.

In yet another example, analyzing (403) the conversational data based on the contextual data uses predictive analysis to analyze conversational data. As mentioned above, predictive analysis encompasses a variety of techniques from statistics, modeling, machine learning, and data mining that analyze current conversational data to make predictions about future conversational data. As a result, predictive analysis can be used to analyze the conversational data based on the contextual data.

As mentioned above, the method includes referencing (404) a completion data source for additional contextual data for the conversational data to further infer a meaning of the conversational data or to provide relevant results. The completion data source may be used as a reference for additional contextual data for the conversational data. In this example, the completion data source includes databases that contain information about corporate data, public internet sources, domain specific databases, other information, or combinations thereof.

As mentioned above, the completion data source may include a corporate data warehouse database. The corporate data warehouse database contains information about corporate data. As a result, information from corporate data may be referenced for additional contextual data for the conversational data.

As mentioned above, the completion data source can include a public internet source. Public internet sources may include public internet sources such as news websites, newsfeed, specific website, information sites, other sources, or combinations thereof. As a result, information from public internet sources may be referenced for additional contextual data for the conversational data or to provide relevant results.

As mentioned above, the completion data source includes a domain specific database. The domain specific databases may contain databases such as medical databases, legal databases, engineering databases, other databases, or combinations thereof. As a result, information from domain specific databases may be referenced for additional contextual data for the conversational data or to provide relevant results.

After a meaning of the conversational data based on the contextual data is inferred, the relevant data is presented (406) in an output device. As mentioned above, relevant data may be a corporation's annual business report or other data. In this example, the corporation's annual business report is presented on an output device such as a projector. As a result, the corporation's annual business report is viewed by individuals in the meeting via the projector.

Figure 5:
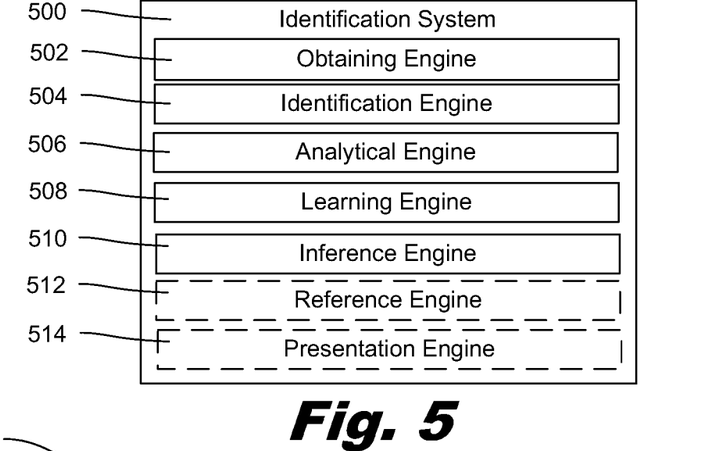
FIG. 5 is a diagram of an example of an identification system according to the principles described herein.

FIG. 5 is a diagram of an example of an identification system (500) according to the principles described herein. The identification system (500) includes an obtaining engine (502), an identification engine (504), an analytical engine (506), a learning engine (506), and an inference engine (510). In this example, the identification system (500) also includes a reference engine (512) and a presentation engine (514). The engines (502, 504, 506, 508, 510, 512, 514) refer to a combination of hardware and program instructions to perform a designated function. Each of the engines (502, 504, 506, 508, 510, 512, 514) may include a processor and memory. The program instructions are stored in the memory and cause the processor to execute the designated function of the engine.

The obtaining engine (502) obtains conversational data from a real time communication. As mentioned above, real time communication may be obtained from individuals and/or user devices. In this example, the real time communication is obtained from user devices. In another example, conversational data from a real time communication may be obtained from individuals. In one example, real time communication may be obtained from a user's voice.

The identification engine (504) identifying contextual data with at least one contextual data source relevant to the real time communication. As mentioned above, contextual data source includes databases that contain information about participants, physical resources, domain taxonomy, association databases, other sources, or combinations thereof.

The analytical engine (506) analyzes the conversational data based on the contextual data using analytical techniques. As mentioned above, analytical techniques can include pattern recognition, data analysis, structured and unstructured analysis, predictive analysis, other forms of analysis, or combinations thereof.

The learning engine (508) learns patterns and relationships from the conversational data based on the contextual data from the analytical engine (506). In one example, the patterns and relationships learned from the learning engine (507) are stored in an association database.

The inference engine (510) infers a meaning of the conversational data based on the contextual data. As mentioned above, the inference engine (510), in communication with the analytical engine (506), processes conversational data based on the contextual data to enhance the capability of the identification system (500). This enhanced capability allows the inference engine (510) to identify relevant information from the real time communication.

The reference engine (512) references a completion data source to provide additional contextual data for the conversational data or to provide relevant results. As mentioned above, a completion data source may include databases that contain information about corporate data, public internet sources, domain specific databases, other sources, or combinations thereof.

The presentation engine (514) presents relevant data on an output device. As mentioned above, relevant information may be stock reports, a corporation's annual business report, among others. Further, an output device may include a laptop computer, a display, a projector, or another appropriate device to display relevant information.

Figure 6:
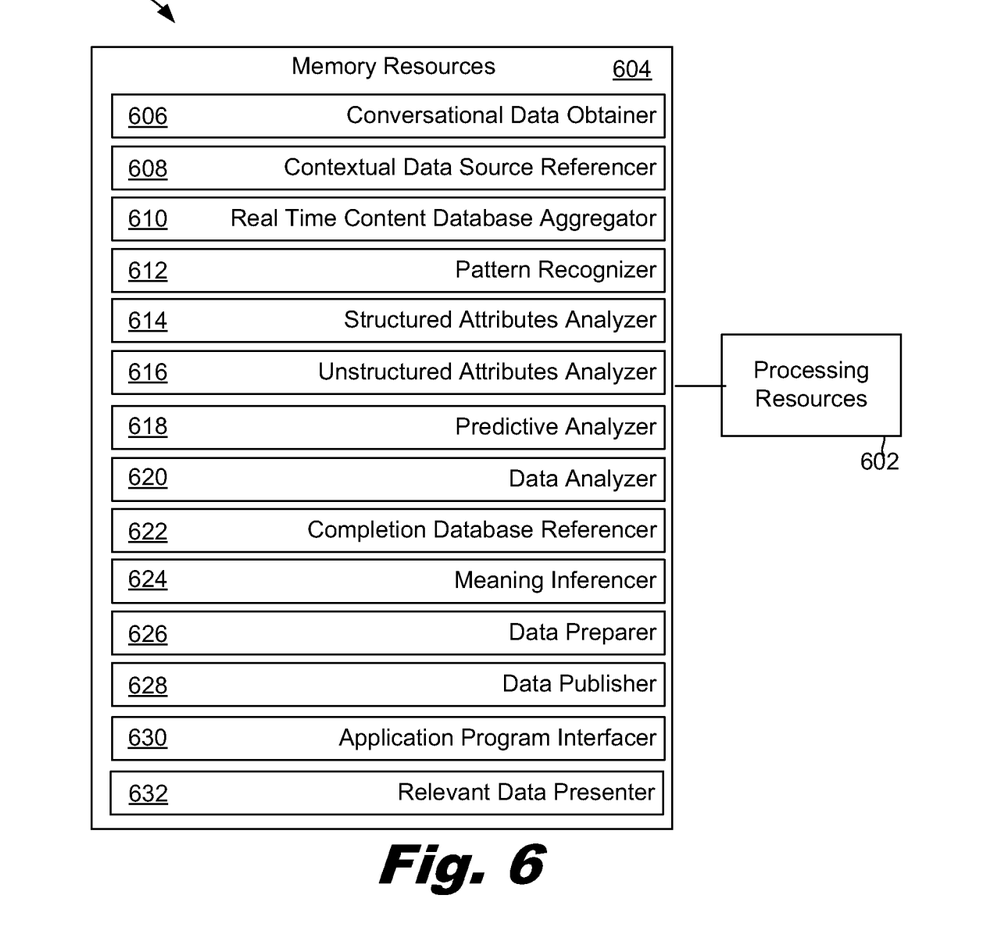
FIG. 6 is a diagram of an example of an identification system according to the principles described herein.

FIG. 6 is a diagram of an example of an identification system (600) according to the principles described herein. In this example, identification system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the identification system (600). The programmed instructions shown stored in the memory resources (604) include a conversational data obtainer (606), a contextual data source reference (608), a real time content database aggregator (610), a pattern recognizer (612), a structured attributes analyzer (614), an unstructured attributes analyzer (616), a predictive analyzer (618), a data analyzer (620), a completion data reference (622), a meaning inference (624), a data preparer (626), a data publisher (628), an application program interface (630), and a relevant data presenter (632).

The memory resources (604) include a computer readable storage medium that contains computer readable program code to cause tasks to be executed by the processing resources (602). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The conversational data obtainer (606) represents programmed instructions that, when executed, cause the processing resources (602) to obtain conversational data from a real time communication. The contextual data source reference (608) represents programmed instructions that, when executed, cause the processing resources (602) to reference at least one contextual data source. The real time content database aggregator (610) represents programmed instructions that, when executed, cause the processing resources (602) to aggregate at least one contextual data source relevant to a real time communication. The pattern recognizer (612) represents programmed instructions that, when executed, cause the processing resources (602) to recognize patterns in conversational data.

The structured attributes analyzer (614) represents programmed instructions that, when executed, cause the processing resources (602) to analyze structured attributes in the conversational data. The unstructured attributes analyzer (616) represents programmed instructions that, when executed, cause the processing resources (602) to analyze unstructured attributes in the conversational data. The predictive analyzer (618) represents programmed instructions that, when executed, cause the processing resources (602) to analyze predictions in the conversational data. The data analyzer (620) represents programmed instructions that, when executed, cause the processing resources (602) to analyze data in the conversational data.

The completion database reference (622) represents programmed instructions that, when executed, cause the processing resources (602) to reference a completion database.

The meaning inference (624) represents programmed instructions that, when executed, cause the processing resources (602) to infer a meaning of the conversational data. The data preparer (626) represents programmed instructions that, when executed, cause the processing resources (602) to prepare relevant data received from an inference engine. The data publisher (628) represents programmed instructions that, when executed, cause the processing resources (602) to publish relevant data received from an inference engine.

The application program interface (630) represents programmed instructions that, when executed, cause the processing resources (602) to interface an application program. The relevant data presenter (632) represents programmed instructions that, when executed, cause the processing resources (602) to present relevant data on an output device.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (602) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries, may be accessed from a remote location over a network connection while the programmed instructions are located locally. Thus, the identification system (600) may be implemented on a user device, on a server, on a collection of servers, or combinations thereof.

The identification system (600) of FIG. 6 may be part of a general purpose computer. However, in alternative examples, the identification system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for identifying relevant content for data gathered from real time communications, the method comprising:
obtaining conversational data from a real time communication at a meeting organized by a meeting organizer for one or more attendees;
identifying contextual data associated with said real time communication from a plurality of contextual data sources, wherein the plurality of contextual data sources contains information about physical resources associated with a location of the meeting, wherein the plurality of contextual data sources contains a corporate directory including information about the meeting organizer and the attendees, wherein the identifying the contextual data comprises:
- determining the attendees based on the physical resources and the corporate directory; and
- determining a role of the meeting organizer in a context of a company and relations of the meeting organizer to the attendees;

inferring a meaning of said conversational data based on said contextual data; and presenting data relevant to said meaning in an output device of the physical resources associated with the location of the meeting, wherein at least a portion of the data relevant to said meaning is restricted from being presented based on access controls associated with the meeting organizer and the attendees.

2. The method of claim 1, wherein said conversational data includes information from text-based messaging sources, voice sources, graphic sources, video sources, or combinations thereof.

3. The method of claim 1, wherein the plurality of contextual data sources contains information about participants, physical resources, a domain taxonomy, an association database, or combinations thereof.

4. The method of claim 1, further comprising:
analyzing said conversational data based on said contextual data using an analytical technique.

5. The method of claim 4, wherein said analytical technique includes pattern recognition, data analysis, structured and unstructured data analysis, predictive analysis, or combinations thereof.

6. The method of claim 1, further includes referencing a completion data source to provide additional contextual data for said conversational data to further infer said meaning of said conversational data.

7. The method of claim 6, wherein said completion data source includes databases that contain information about corporate data warehouses, public internet sources, domain specific databases, or combinations thereof.

8. A system for identifying relevant content for data gathered from real time communications, the system comprising:
at least one processor; and
a memory storing instructions that, when executed by the at least one processor, cause the system to:
obtain conversational data from a real time communication at a meeting organized by a meeting organizer for one or more attendees;
identify contextual data associated with said real time communication from a plurality of contextual data sources, wherein the plurality of contextual data sources contains information about physical resources associated with a location of the meeting, wherein the plurality of contextual data sources contains a corporate directory including information about the meeting organizer and the attendees, wherein the identifying the contextual data comprises:
- determining the attendees based on the physical resources and the corporate directory; and
- determining a role of the meeting organizer in a context of a company and relations of the meeting organizer to the attendees;

analyze said conversational data based on said contextual data;

infer a meaning of said conversational data based on said contextual data; and present data relevant to said meaning in an output device of the physical resources associated with the location of the meeting, wherein at least a portion of the data relevant to said meaning is restricted from being presented based on access controls associated with the meeting organizer and the attendees.

9. The system of claim 8, wherein the instructions further cause the system to reference a completion data source to provide additional contextual data for said conversational data to further infer said meaning of said conversational data.

10. The system of claim 8, wherein said patterns and said relationships are stored in an association database for inferring said meaning of said data gathered from said real time communications in subsequent operations.

11. A computer program product for identifying relevant content for data gathered from real time communications, comprising:
a tangible computer readable storage medium, said tangible computer readable storage medium comprising computer readable program code embodied therewith, said computer readable program code comprising program instructions that, when executed, causes a processor to:
obtain conversational data from a real time communication at a meeting organized by a meeting organizer for one or more attendees;
identify contextual data associated with said real time communication from a plurality of contextual data sources, wherein the plurality of contextual data sources contains information about physical resources associated with a location of the meeting, wherein the plurality of contextual data sources contains a corporate directory including information about the meeting organizer and the attendees, wherein the identifying the contextual data comprises:
- determining the attendees based on the physical resources and the corporate directory; and
- determining a role of the meeting organizer in a context of a company and relations of the meeting organizer to the attendees;

analyze said conversational data based on said contextual data;

infer a meaning of said conversational data based on said contextual data; and present data relevant to said meaning in an output device of the physical resources associated with the location of the meeting, wherein at least a portion of the data relevant to said meaning is restricted from being presented based on access controls associated with the meeting organizer and the attendees.

12. The product of claim 11, further comprising computer readable program code comprising program instructions that, when executed, causes said processor to reference a completion data source to provide additional contextual data for said conversational data to further infer said meaning of said conversational data.

* * * * *